F. R. KUNKEL.
VENTILATING FAN.
APPLICATION FILED JUNE 12, 1905.

969,707.

Patented Sept. 6, 1910.

WITNESSES:
C. L. Belcher
Otto S. Schairer.

INVENTOR
Fred R. Kunkel
BY
ATTORNEY

UNITED STATES PATENT OFFICE.

FRED R. KUNKEL, OF WILKINSBURG, PENNSYLVANIA.

VENTILATING-FAN.

969,707.   Specification of Letters Patent.   Patented Sept. 6, 1910.

Application filed June 12, 1905. Serial No. 264,868.

*To all whom it may concern:*

Be it known that I, FRED R. KUNKEL, a citizen of the United States, and a resident of Wilkinsburg, in the county of Allegheny and State of Pennsylvania, have invented a new and useful Improvement in Ventilating-Fans, of which the following is a specification.

My invention relates to fans for ventilating purposes and it has for its object to so improve the form of fan blades that the velocity of the air that is delivered from the fan may be the same at all distances from its axis of rotation.
Neglecting the effect of friction, the velocity of the air that is delivered from a fan at any radius normally to the plane of rotation is proportional to the product of the length of that radius, and the tangent of the angle formed between the plane of rotation of the fan and a tangent line to the delivering edge of a fan blade at the extremity of the radius and at right angles to the radius.
My invention consists in so forming the fan blades that this product, and consequently the velocity of the air delivered, may be approximately constant at all distances from the axis of rotation of the fan, eddy currents and other energy-wasting disturbances of the air being thereby avoided.

I have found that the tangent of the angle which a tangent line to a blade at its receiving edge should make with the plane of rotation for most advantageous and effective operation is approximately one-half the tangent of the angle which a tangent line to the blade at its discharge edge makes with the plane of rotation, the said tangent lines being perpendicular to radii of the fan.

Accordingly my invention consists further in shaping the blades so that the tangents of the angles formed by tangent lines to the receiving edges shall be approximately one-half the tangents of the angles formed by tangent lines to the delivering edges at corresponding distances from the axis of rotation and so that the product of the radii and the tangents of the angles formed between tangent lines to the receiving edges and the plane of rotation may be approximately constant, the said tangent lines being again perpendicular to radii of the fan.
My invention consists further in so shaping the outer ends of the blades that the velocity of the air delivered from the ends of the blades gradually reduces to zero at the extremities, eddy currents at these locations and noise incident to the operation of the fan being in this manner minimized.

Figure 1:
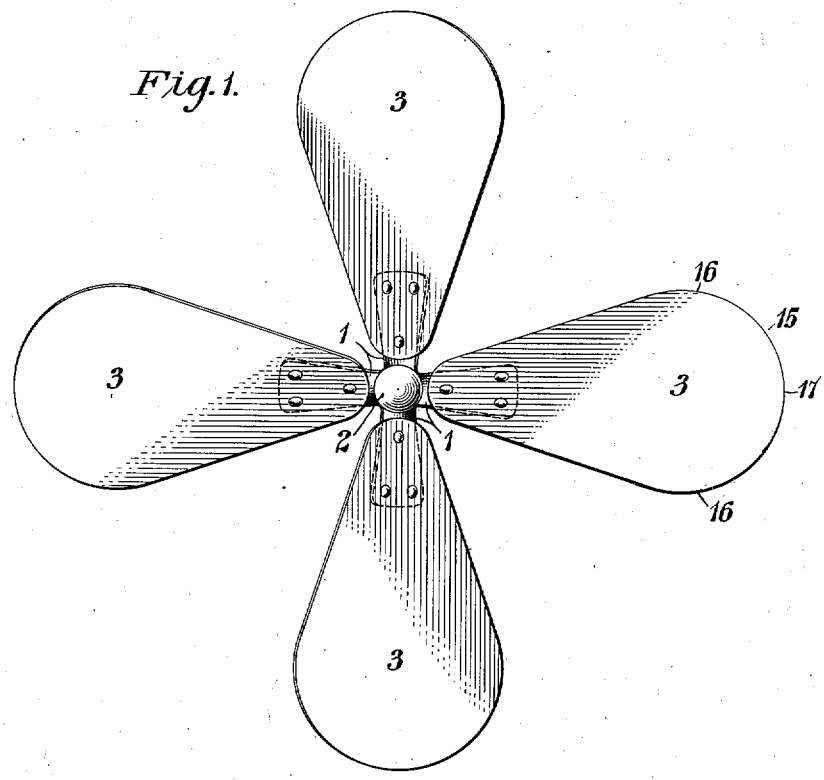
Figure 2:
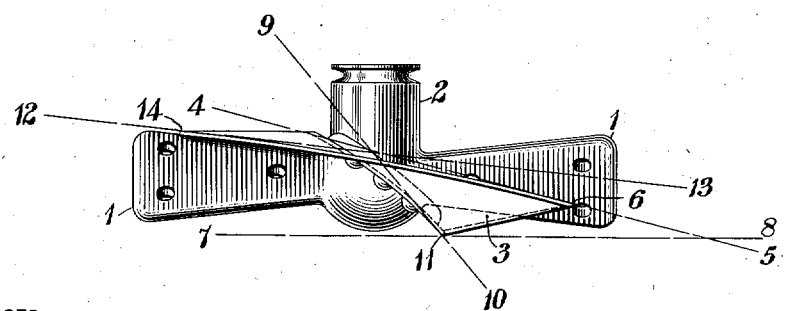

My invention is illustrated in the accompanying drawing, Figure 1 of which is a view in front elevation of a fan constructed in accordance therewith and Fig. 2 is an end view of one blade of the fan shown in Fig. 1.

Rigidly secured to arms 1 of a hub 2 that is adapted to be mounted upon the armature shaft of an electric motor (not shown) or that is adapted to be otherwise rotatably mounted, are fan blades 3 having warped surfaces.

In accordance with the above stated principles, each of the fan blades is so formed that the product of the tangent of the angle formed between a line 4—5 drawn tangent to the blade at a point 6 and perpendicular to the radius terminating at the point 6 and a line 7—8 that is drawn parallel to the plane of rotation of the blade, and the distance of the point 6 from the axis of rotation shall be constantly equal to the product of corresponding quantities at any other point on the same edge of the blade as the point 6. For instance, the product which includes the tangent of the angle formed between the line 7—8 and the line 4—5 which is drawn tangent to the blade at the point 6 which is near the outer extremity thereof, is equal to the product which includes the tangent of the angle formed between the line 7—8 and a line 9—10 that is drawn tangent to the discharge edge of the blade and perpendicular to the radius terminating at a point 11, which is located nearer the axis of rotation than the point 6. This product should remain constant regardless of the distance from the axis of rotation of the point on the discharge edge of the blade to which the tangent line is drawn.

The tangent of the angle formed between the line 7—8 and a line 12—13 that is drawn tangent to the receiving edge of the blade and perpendicular to the radius terminating at a point 14 which is located near the outer extremity of the blade and at the same distance from the axis of rotation as the point 6, should be one-half the tangent of the angle formed between the lines 7—8 and 4—5. The blade is so constructed that the tangents of the angles formed by tangents to the receiving edges of the blade are constantly equal to one-half the tangents of the corresponding angles at the discharge edge of the blade.

In order to further reduce the eddy currents and the noise incident to the operation of the fan the outer ends 15 of the blades may be rounded as shown so that the velocity of the air delivered by the fan gradually decreases to zero from the points 16 toward the tips 17. Of course, the rounded end portions of the blades do not fulfil the same conditions of design as the remaining portions.

If the fan blades are formed in accordance with the principles herein set forth the velocity of the air that is delivered from the fan will be the same at all distances from the axis of rotation, except near the outer edge of the fan, as pointed out, and they may conveniently be given forms differing somewhat from that here shown without departing from my invention so long as these principles are observed. With the blades constructed as set forth, substantially all of the air delivered by the fan is delivered in a direction perpendicular to the plane of rotation, a result that is highly desirable in many classes of service.

I claim as my invention:

1. A rotatably mounted fan blade which is so formed that the products of the speeds of travel of points on the discharge edge of the blade and the tangents of angles formed between the plane of rotation and lines tangent to the blade and perpendicular to the radii terminating at those points may be approximately constant.

2. A rotatably mounted fan blade, having a warped surface which is so shaped that the tangents of the angles formed between the plane of rotation and lines tangent to the blade at the discharge edge and to the circles of rotation may be constantly and approximately equal to twice the tangents of the corresponding angles formed by lines tangent to the blade at the receiving edge and to the circles of rotation.

3. A rotatably mounted fan blade which is so formed that the products of the distances of points on the discharge edge of the blade from the axis of rotation and the tangents of the angles formed between the plane of rotation and lines tangent to the blade and to the circles of rotation at those points may be approximately constant, and also so that the tangents of the angles formed between the plane of rotation and lines tangent to the discharge edge of the blade and to the corresponding circles of rotation may be constantly and approximately equal to twice the tangents of the angles formed between the plane of rotation and similar tangent lines to corresponding points on the receiving edge of the blade.

4. A rotatably mounted fan blade, having a warped surface which is so shaped that the tangents of the angles formed between the plane of rotation and lines tangent to the blade at the discharge edge and to the circles of rotation may be constantly and approximately equal to twice the tangents of the corresponding angles formed by similar tangent lines to the blade at the receiving edge and the outer extremity of which is rounded.

In testimony whereof, I have hereunto subscribed my name this 6th day of June 1905.

FRED R. KUNKEL.

Witnesses:
GEO. D. PARSLEY, Jr.,
BIRNEY HINES.

---

It is hereby certified that Letters Patent No. 969,707, granted September 6, 1910, upon the application of Fred R. Kunkel, of Wilkinsburg, Pennsylvania, for an improvement in "Ventilating-Fans," were erroneously issued to said inventor, whereas they should have been issued to *Westinghouse Electric & Manufacturing Company, a corporation of Pennsylvania*, as owner of the entire interest in said invention, as shown by the records of assignments in this office; and that the said Letters Patent should be read with this correction therein that the same may conform to the record of the case in the Patent Office.

Signed and sealed this 27th day of September, A. D., 1910.

[SEAL.]

C. C. BILLINGS,
*Acting Commissioner of Patents.* receiving edges of the blade are constantly equal to one-half the tangents of the corresponding angles at the discharge edge of the blade.

In order to further reduce the eddy currents and the noise incident to the operation of the fan the outer ends 15 of the blades may be rounded as shown so that the velocity of the air delivered by the fan gradually decreases to zero from the points 16 toward the tips 17. Of course, the rounded end portions of the blades do not fulfil the same conditions of design as the remaining portions.

If the fan blades are formed in accordance with the principles herein set forth the velocity of the air that is delivered from the fan will be the same at all distances from the axis of rotation, except near the outer edge of the fan, as pointed out, and they may conveniently be given forms differing somewhat from that here shown without departing from my invention so long as these principles are observed. With the blades constructed as set forth, substantially all of the air delivered by the fan is delivered in a direction perpendicular to the plane of rotation, a result that is highly desirable in many classes of service.

I claim as my invention:

1. A rotatably mounted fan blade which is so formed that the products of the speeds of travel of points on the discharge edge of the blade and the tangents of angles formed between the plane of rotation and lines tangent to the blade and perpendicular to the radii terminating at those points may be approximately constant.

2. A rotatably mounted fan blade, having a warped surface which is so shaped that the tangents of the angles formed between the plane of rotation and lines tangent to the blade at the discharge edge and to the circles of rotation may be constantly and approximately equal to twice the tangents of the corresponding angles formed by lines tangent to the blade at the receiving edge and to the circles of rotation.

3. A rotatably mounted fan blade which is so formed that the products of the distances of points on the discharge edge of the blade from the axis of rotation and the tangents of the angles formed between the plane of rotation and lines tangent to the blade and to the circles of rotation at those points may be approximately constant, and also so that the tangents of the angles formed between the plane of rotation and lines tangent to the discharge edge of the blade and to the corresponding circles of rotation may be constantly and approximately equal to twice the tangents of the angles formed between the plane of rotation and similar tangent lines to corresponding points on the receiving edge of the blade.

4. A rotatably mounted fan blade, having a warped surface which is so shaped that the tangents of the angles formed between the plane of rotation and lines tangent to the blade at the discharge edge and to the circles of rotation may be constantly and approximately equal to twice the tangents of the corresponding angles formed by similar tangent lines to the blade at the receiving edge and the outer extremity of which is rounded.

In testimony whereof, I have hereunto subscribed my name this 6th day of June 1905.

FRED R. KUNKEL.

Witnesses:
GEO. D. PARSLEY, Jr.,
BIRNEY HINES.

---

It is hereby certified that Letters Patent No. 969,707, granted September 6, 1910, upon the application of Fred R. Kunkel, of Wilkinsburg, Pennsylvania, for an improvement in "Ventilating-Fans," were erroneously issued to said inventor, whereas they should have been issued to *Westinghouse Electric & Manufacturing Company, a corporation of Pennsylvania*, as owner of the entire interest in said invention, as shown by the records of assignments in this office; and that the said Letters Patent should be read with this correction therein that the same may conform to the record of the case in the Patent Office.

Signed and sealed this 27th day of September, A. D., 1910.

[SEAL.]

C. C. BILLINGS,
*Acting Commissioner of Patents.*

Correction in Letters Patent No. 969,707.

It is hereby certified that Letters Patent No. 969,707, granted September 6, 1910, upon the application of Fred R. Kunkel, of Wilkinsburg, Pennsylvania, for an improvement in "Ventilating-Fans," were erroneously issued to said inventor, whereas they should have been issued to *Westinghouse Electric & Manufacturing Company, a corporation of Pennsylvania*, as owner of the entire interest in said invention, as shown by the records of assignments in this office; and that the said Letters Patent should be read with this correction therein that the same may conform to the record of the case in the Patent Office.

Signed and sealed this 27th day of September, A. D., 1910.

[SEAL.]

C. C. BILLINGS,
*Acting Commissioner of Patents.*